United States Patent [19]

Fukuda et al.

[11] Patent Number: 5,071,690
[45] Date of Patent: Dec. 10, 1991

[54] MOLDABLE BIAXIALLY STRETCHED POLYESTER FILM

[75] Inventors: Yujiro Fukuda; Tomoyuki Kotani, both of Machida, Japan

[73] Assignee: Diafoil Company, Limited, Tokyo, Japan

[21] Appl. No.: 472,030

[22] Filed: Jan. 30, 1990

[30] Foreign Application Priority Data

Feb. 1, 1989 [JP] Japan .................................. 1-23333
Aug. 7, 1989 [JP] Japan ................................ 1-204412
Aug. 7, 1989 [JP] Japan ................................ 1-204413
Nov. 17, 1989 [JP] Japan ................................ 1-299425

[51] Int. Cl.$^5$ ............................................. D06N 7/00
[52] U.S. Cl. .................................. 428/141; 428/480; 528/308.1; 528/308.2
[58] Field of Search ...................... 428/480, 213, 141; 528/308.1, 308.2

[56] References Cited

FOREIGN PATENT DOCUMENTS 64-40400  2/1989  Japan .
64-45699  2/1989  Japan .
2165130   4/1986  United Kingdom .

Primary Examiner—Merrell C. Cashion, Jr.
Assistant Examiner—D. S. Nakarani
Attorney, Agent, or Firm—David G. Conlin; David S. Resnick

[57] ABSTRACT

Disclosed herein is a moldable biaxially stretched polyester film having a tensile strength at 100% elongation ($F_{100}$), measured in an atmosphere of 150° C., of 0.5 to 7 kg/mm$^2$.

The biaxially stretched polyester film according to the present invention is excellent in moldability.

4 Claims, 1 Drawing Sheet

MOLDABLE BIAXIALLY STRETCHED POLYESTER FILM

BACKGROUND OF THE INVENTION

The present invention relates to a moldable biaxially stretched polyester film having an excellent moldability, flatness and heat resistance.

Conventionally biaxially stretched polyester films have been widely used for a variety of industrial uses because of their excellent mechanical strength and heat resistance. For examples, polyester films have been investigated as a raw or ancillary material for vacuum forming, air-pressure forming, overhanging forming, cold forming, injection molding, in-molding, embossing, etc., and also have been investigated to use them a film for molding-transferring, a film for molding container, an insulating film, a packaging film, a decorative film, etc.

However, biaxially stretched polyester films are inferior in moldability in general to vinyl chloride resins, and therefore, the films have been difficult to be applied for the above uses. And, in particular, improving the moldability of biaxially stretched polyester film have been desired in using the film as a base film for molding-transferring or molding container.

SUMMARY OF THE INVENTION

In an aspect of the present invention, there is provided a moldable biaxially stretched polyester film having a tensile strength at 100% elongation ($F_{100}$), measured in an atmosphere of 150° C., of 0.5 to 7 kg/mm$^2$.

BRIEF DESCRIPTION OF THE DRAWINGS

In FIG. 1, numeral 1 indicates a mold, numeral 2 indicates an injection machine, numeral 3 indicates a biaxially stretched polyester base film according to the present invention, and numeral 4 indicates a layer comprising an adhesive layer, a printing layer and a release layer.

DETAILED DESCRIPTION OF THE INVENTION

Figure 1:
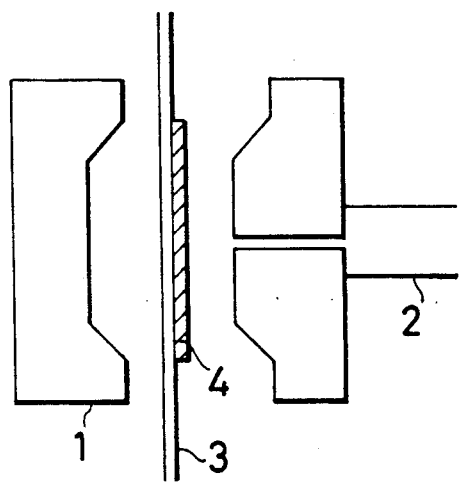
FIG. 1 is a schematic representation of an equipment for molding-transferring process wherein both molding and transferring are conducted simultaneously.

The polyesters used in the present invention comprises one or more of dicarboxylic acid units derived from dicarboxylic acid such as terephthalic acid, oxalic acid, malonic acid, succinic acid, adipic acid, azelaic acid, sebacic acid, phthalic acid, isophthalic acid, naphthalenedicarboxylic acid, diphenyletherdicarboxylic acid, etc., and one or more of diol units derived from diol such as ethylene glycol, propylene glycol, trimethylene glycol, tetramethylene glycol, hexamethylene glycol, diethylene glycol, triethylene glycol, polyalkylene glycol, 1,4-cyclohexane dimethanol, neopentyl glycol, etc.

The polyesters used in the present invention may have other units derived from other comonomers, so far as the polyesters obtained can substantially be liner. For the comonomers, hydroxycarboxlic acids such as p-hydroxybenzoic acid, a monofunctional compounds such as benzoic acid, benzoylbenzoic acid and methoxypolyalkylene glycol, polyfunctional compounds such as glycerine and pentaerythritol may be exemplified.

The content of the ethylene terephthalate unit in the polyester which constitutes the film according to the present invention is preferably 50 mol % or more, more preferably 70 mol % or more. A film obtained from a polyester having the ethylene terephthalate unit in a content of less than 50 mol % is unfavorably insufficient in mechanical strength and heat resistance.

It is preferred for the polyester constituting the film according to the present invention to have a unit derived from an aliphatic dicarboxylic acid as the dicarboxylic acid component in an amount of 1 to 20 mol %, more preferably 1 to 10 mol % based on the total dicarboxylic acid components, in view of the improvement in moldability and heat resistance of the film and reduction of unevenness in thickness of the film. When the content exceeds 20 mol %, the film obtained is impaired in heat resistance and the unevenness of the film thickness becomes greater. When less than 1 mol %, the improvement in moldability and heat resistance of the film cannot be expected.

As the aliphatic dicarboxylic acid which may be contained in the polyester constituting the film according to the present invention, those having 4 to 12 carbon atoms, preferably 6 to 12 carbon atoms, may be used because of their ability for improving moldability and heat resistance and reducing unevenness of thickness.

In addition, for improving easy slipping characteristics of the film, it is preferred for the polyester to be blended with fine particles of organic lubricants, inorganic lubricants, etc. Also, if necessary, additives such as stabilizer, coloring agent, antioxidant, anti-foaming agent, antistatic agent, etc. may be blended with the polyester. The fine particles providing the film with slipping characteristics may include inert external particles such as kaolin, clay, calcium carbonate, silicon oxide, calcium terephthalate, aluminum oxide, titanium oxide, calcium phosphate, lithium fluoride, carbon black, etc.; high-melting point organic compounds and cross-linked polymers which are infusible at the time of melt film forming process of the polyester; and internal particles which are formed in the polyester during the production of the polyester from metal compound used as a catalyst for polyester synthesis such as alkali metal compounds, alkaline earth metal compounds, etc. The content of the fine particles in the film is preferably in the range from 0.002 to 5.0% by weight, and the average particle size is preferably in the range from 0.001 to 10.0 μm.

The intrinsic viscosity of the polyester film according to the present invention is preferably 0.50 or above, more preferably 0.60 or above. When the intrinsic viscosity of film is less than 0.50, the film undesirably has an insufficient mechanical strength and moldability.

The moldability of the film according to the present invention can be further improved by incorporating a plasticizer. The plasticizer usable in the present invention includes aromatic dicarboxylic acid esters such as dimethyl phthalate, diethyl phthalate, di-n-butyl phthalate, di-n-hexyl phthalate, di-n-heptyl phthalate, di-2-ethylhexyl phthalate, di-n-octyl phthalate, di-n-nonyl hthalate, diethyl isophthalate, di-n-butyl isophthalate, di-2-ethylhexyl isophthalate, diethyl terephthalate, di-n-butyl terephthalate, di-2-ethylhexyl terephthalate, etc.; phosphoric acid esters such as triethyl phosphate, tri-n-butyl phosphate, trioctyl phosphate, cresyl phosphate, etc.; sebacic acid esters such as dimethyl sebacate, diethyl sebacate, di-n-butyl sebacate, diamyl sebacate, etc.; adipic acid esters such as hexyl adipate, etc.; esters such as butyl phthalyl butyl glycolate, tributyl citrate, tetrahydrofurfuryl oleate, methyl acetyl ricinoleate, etc.; and polyethylene glycol, etc. The plasticizer to be used in the present invention is not limited to these examples.

Of the above plasticizers, the aromatic dicarboxylic acid esters are preferable because they have excellent heat resistance and are free from problems of sublimation and bleedout during film-forming process. In particular, the plasticizer of phthalic acid ester type is preferred because of its high heat resistance and ability of improving moldability of film.

The melting point at atmospheric pressure of the plasticizer used in the present invention is preferably 300° C. or higher, more preferably 350° C. or higher. When a film contains a plasticizer having a melting point less than 300° C., deterioration by heat of the film during extrusion process is remarkable and a large quantity of sublimate is generated.

The solubility parameter of the plasticizer used in the present invention is preferably 6.5 to 11.0 $[(cal/cm^3)^{\frac{1}{2}}]$, more preferably 7.0 to 10.0 $[(cal/cm^3)^{\frac{1}{2}}]$. When a plasticizer having a solubility parameter less than 6.5 or more than 11.0 is used, the moldability of films can not be improved because such a plasticizer can not uniformly impregnate into the films due to its poor capacity for swelling the polyester.

The content of the plasticizer in the film according to the present invention is preferably 0.01 to 5 wt %, more preferably 0.05 to 2 wt % based on the weight of the film. When the content exceeds 5 wt %, the plasticizer contained in the film remarkably bleeds out into the surface of the film and a release layer and a printing layer provided on the film surface undesirably become too easy to release. When the content is less than 0.01 wt %, improvement in moldability of the film can not be expected.

The tensile strength at 100% elongation measured in an atmosphere of 150° C. ($F_{100}$) of the film according to the present invention is 0.5 to 7 $kg/mm^2$. The value of $F_{100}$ herein referred is an average value of the tensile strengths in the machine direction and the transverse direction of the film at 100% elongation in an atmosphere of 150° C. Preferable range of $F_{100}$ is 0.5 to 5 $kg/mm^2$ and more preferable range is 0.5 to 3 $kg/mm^2$.

From the results of the inventors investigation, it has turned out that the $F_{100}$ value closely relates to moldability of polyester film, and a film having an $F_{100}$ value of more than 7 $kg/mm^2$ undesirably has poor moldability. Also a film having an $F_{100}$ value of less than 0.5 $kg/mm^2$ leads to undesired uniform deformation during molding process, and in a transfer film, for example, undesired distortion of the printed patterns to be transferred occurs. The difference between the $F_{100}$ values in the machine direction and the transverse direction is preferably 3 $kg/mm^2$ or less, more preferably 2 $kg/mm^2$ or less. When the difference is more than 3 $kg/mm^2$, the moldability of the film becomes poor because of increased anisotropy.

The reasons for such a significant correlation between the $F_{100}$ value and the moldability of the film are not clear. However, from the results of the present inventors' observation on the behaviors of the films during vacuum formings, the phenomena are inferred as follows. A polyester film, in general, is vacuum-formed in a mold having a ratio of average opening diameter to depth in the range of 10:1 to 1:1 after heated at a temperature between 100° to 200° C. During this vacuum forming, the polyester film at the vicinity of the corners of the mold can be regarded to be forcedly and locally stretched with at least 100% of elongation. In a film having a higher $F_{100}$ value, an extremely high partial stress generates at the locally stretched areas of the film, and this stress concentration tends to cause easy breaking of the film, thereby the moldability of the film being considered to be deteriorated. While in a film having an extremely low $F_{100}$ value of less than 0.5 $kg/mm^2$, although the film has a good moldability, only extremely low tension generates at uniformly stretched portions such as flat parts of the mold, and as the result, this portion of the film is considered to be difficult to be uniformly stretched.

The planar orientation ($\Delta P$) of the film according to the present invention is preferably in the range of 0.040 to 0.140, more preferably 0.050 to 0.120. A film having a planar orientation larger than 0.140 is undesirably insufficient in moldability. When the planar moldability is less than 0.040, the mechanical strength of the film is lowered and the flatness thereof becomes poor.

The average refractive index ($\bar{n}$) of the film according to the present invention is preferably in the range of 1.50 to 1.598. When the average refractive index is larger than 1.598, the crystallinity of the film becomes undesirably high. When less than 1.550, the crystallinity of the film is insufficient, resulting in poor heat resistance.

The heat of fusion of the film according to the present invention is preferably in the range of 1 to 8 cal/g, more preferably 1 to 6 cal/g. A film having a heat of fusion over 8 cal/g is not preferred because of its lowered moldability. While, a film having a heat of fusion less than 1 cal/g is also not preferred, because such a film requires complicated process such as vacuum drying due to great difficulty in crystallization of polyester during raw material drying step for film forming.

As for shrink characteristic, the film according to the present invention is preferred to have a heat shrinkage of 10% or less, more preferably 5% or less in both the machine and transverse directions after heat treatment at a temperature of 150° C. for 3 minutes. A film having a heat shrinkage of larger than 10% in either the machine or transverse directions is not preferred because the film greatly shrinks in a heating zone during the processing step. In particular, when the film is used as a transfer film, the heat shrinkage under the same condition is preferred to be not more than 0% (when the film is expanded, its heat shrinkage is represented by a minus value). A film having a heat shrinkage more than 0% in the transverse direction is not preferred to be used as a mold-transfer film, because the film tends to shrink in the transverse direction during drying step after the formation of a printing layer.

The density of the film according to the present invention is preferably in the range of 1.345 to 1.390 $g/cm^3$, more preferably 1.355 to 1.380 $g/cm^3$. A film having a density of less than 1.345 $g/dm^3$ is undesirably insufficient in heat resistance, and a film having a density of larger than 1.390 $g/cm^3$ is undesirably insufficient in moldability.

As for mechanical strength, the film according to the present invention is preferred to have a Young's modulus of 300 $kg/mm^2$ more, more preferably 350 $kg/mm^2$ in both the machine direction and the transverse direction. A film having a Young's modulus less than 300 $kg/mm^2$ is not preferred because the film is easily stretched during a molding step.

The birefringence of the film according to the present invention is preferably 0.025 or less, more preferably 0.020 or less. A film having a birefringence larger than 0.025 is not preferred because the anisotropy of the film becomes remarkable to lead a poor moldability.

The center line average surface roughness (Ra) of the film according to the present invention is preferably 0.05 to 0.5 μm, more preferably 0.1 to 0.4 μm. A film having Ra larger than 0.5 μm is not preferred because the surface gloss of the film is remarkably lowered. A film having Ra less than 0.05 μm is not preferred because of its insufficient surface gloss.

The thickness of the film according to the present invention is not particularly limited, however, a preferred thickness for a film used as a mold-transfer film is 5 to 500 μm, more preferably 5 to 200 ∞m. A preferred thickness of a film used for molding containers is 5 to 500 μm, more preferably 5 to 200 μm.

The thickness unevenness of the film according to the present invention is usually 40% or less, more preferably 30% or less. A film having a thickness unevenness larger than 40% is not preferred because of its poor moldability and uniform stretch during molding process of the film. These undesired processabilities lead to distortion of patterns during molding-transferring process and braking or ply separation during molding of containers.

The gloss Gs(60°) of the film according to the present invention is preferably in the range of 10 to 90%, more preferably 20 to 90%. A film having a gloss less than 10% is not preferred because of the surface gloss of the film is insufficient and the surface of a molded article obtained therefrom is roughened. A film having a gloss more than 90% is also not preferred because this film provides a molded article with an insufficient delustering surface when used as mold-transfer film.

In the following, a process for producing the film according to the present invention will be described in detail, however, the process is not specifically restricted to that described below as long as the requirement of the present invention is satisfied.

After drying a polyester containing, when required, a plasticizer, inorganic particles as a lubricant, etc. by a conventional dryer or vacuum dryer such as hopper dryer, paddle dryer, oven, etc., the dried polyester is extruded at a temperature of 200° to 320° C. As the method of extruding, any of the conventional methods such as T-die method, tubular method, etc. can be employed. In addition, adding a plasticizer to the polyester is permitted when extruding.

After extruding, the extruded material is quenched to obtain an amorphous sheet. By employing an electrostatic cooling method for the quenching, thickness unevenness of the amorphous sheet can be preferably improved.

The amorphous sheet is then stretched in both the machine direction and the transverse direction in an areal stretch ratio of 6 times or above, preferably 8 times or above, more preferably 8 top 25 times to obtain a biaxially stretched (oriented) film. The thus obtained biaxially stretched film is subjected to heat treatment at a temperature of 150° to 220° C. after, if necessary, restretched in the machine direction and/or the transverse direction at a respective stretch ratio of to times the original length, to obtain a biaxially stretched polyester film according to the present invention.

In the heat treatment step, it is preferred to provide the film with 0.1 to 30% relaxation in the machine direction and/or the transverse direction in highest temperature zone of heat treatment and/or cooling zone at the outlet of heat treatment. In particular, 5 to 30% relaxation in the transverse direction is preferred. Also heat treatment may be conducted by two-stage method.

A coating layer may be formed on either or both surfaces of the films or corona discharge treatment may be applied on the film surfaces after or during stretching step for the purpose of providing the film with adhesive properties, antistatic properties, slipping properties, release properties, etc.

The present invention will be described more in detail while referring the following non-limitative Examples. The valuation methods are as follows.

(1) Tensile Strength ($F_{100}$) (kg/mm$^2$) at 100% Elongation at an Atmosphere of 150° C.

The thermostat of a tensile tester of INTESCO Model-2001 equipped with a thermostat made by INTESCO Co., Ltd. was maintained at 150° C. A film of 15 mm width was mounted in the tester with a chuck interval of 50 mm. After allowing the film to stand for 2 min., the tensile strength at 100% elongation was measured at a stress rate of 200 mm/min. The measurement was conducted in both the machine direction and the transverse direction, and the average thereof was employed as $F_{100}$ value. When a film was broken before 100% elongation was achieved, $F_{100}$ value of such a film was calculated according to the following equation.

$$\text{Tensile strength at 100\% elongation (kg/mm}^2\text{)} = \text{Tensile strength at breakage (kg/mm}^2\text{)} \times \frac{100}{\text{Elongation at breakage}}$$

(2) Thickness Unevenness

Using a continuous film thickness gauge (using a micrometer) made by Anritsu Electric Company, Limited, the film thickness along the machine direction of a film over a distance of 5 m was measured to calculate the thickness unevenness of film according to the following equation.

$$\text{Thickness unevenness} = \frac{\text{Maximum thickness} - \text{Minimum thickness}}{\text{Average thickness}} \times 100(\%)$$

(3) Average Refractive Index ($\bar{n}$), Degree of planar orientation ($\Delta P$) and Index of birefringence ($\Delta n$)

The refractive index of the film was measured by an Abbe's refractometer mfd. by Atago Co., Ltd., using a sodium lamp as light source. Each of the values were calculated according to the following equations.

$$\bar{n} = \tfrac{1}{3}(n_{60} + n_{62} + n_{65})$$

$$\Delta P = \tfrac{1}{2}(n_\beta + n_\gamma) - n_\alpha$$

$$\Delta n = n_\gamma - n_\beta$$

wherein, $r_\gamma$, $n_\beta$ and $n_\alpha$ respectively represent a maximum refractive index in the film plane, the refractive index in the direction orthogonal thereto and the refractive index in the thickness direction.

(4) Heat of Fusion of Film (cal/g)

The peak area accompanied by the fusion of crystalline of a sample was determined by using a differential scanning calorimeter DSC-1 mfd. by Parkin-Elmer Co. at a rate of temperature rise of 16° C./min. Then, the heat of fusion was calculated according to the following equation.

$$\text{Heat of fusion of film} = A \times S \times \frac{1}{m} \text{ (cal/g)}$$

wherein A represents a heat of fusion per unit area (cal/cm$^2$) on the chart obtained by measuring indium according to the same conditions as above, S represents the peak area (cm$^2$) of specimen when fused, and m represents the weight (g) of specimen.

(5) Intrinsic Viscosity [η]

Adding 200 mg of specimen to a 20 ml of mixed solvent of phenol/tetrachoroethane of 50/50 and then heating the mixture at 110° C. for 30 min. The intrinsic viscosity was measured using this solution at 30° C.

(6) Heat Shrinkage (%)

A film was heat-shrunk without loading in a geared oven of 150±2° C. for 3 min. The heat shrinkages in both the machine direction and the transverse direction were calculated from the following equation.

$$\text{Heat shrinkage} = \frac{L_0 - L}{L_0} \times 100(\%)$$

$L_0$: initial length (10 cm)
L: length after shrinkage (7) Center Line Average Surface Roughness Ra (μm)

Ra was determined in the following way by using a surface roughness meter (Se-3FK) made by Kosaka kenkyusho Co., Ltd. From the film surface roughness curve (sectional curve of film), a portion with a standard length L (2.5 mm) in the direction of center line was taken out. Expressing the roughness curve as Y=f(x) with the center line of the portion taken out representing the X axis and the direction vertical to the center line representing the Y axis, the value given from the following formula was presented as Ra (μm):

$$Ra = \frac{1}{L} \int_0^L |f(x)| dx$$

The radius of the end of the feeler was 2 μm, the load 30 mg and cut-off value was 0.08 mm. Ra shown here is the average of the measurements on total 10 surface roughness curves.

(8) Gloss Gs(60°)

Using a glossmeter of model VGS-1001DP made by Nippon Densyoku Co., Ltd., a 60° specular gloss Gs(60°) of a film was measured according to JIS Z 8741. That is, the reflectance of a specimen was measured based on the reflectance of a standard black plate st an incidence and a reflection angles of 60°.

(9) Moldability as a Transfer Film

After performing a film by vacuum forming and airpressure forming in the cavity of a mold (I) or a 10 cm long, 10 cm wide and a 2 cm maximum depth shown in FIG. 1, a heated resin of a given type was injected therein for molding. The moldability was evaluated based on the frequency of film break as follows.

O: no film break take place.
Δ: occasional film break take place at one or two portions of the film, resulting in trouble during continuous operation.
X: frequent film breaks take place and can not be used in practice.

(10) Applicability as a Transfer Film

As shown in FIG. 1, after forming a layer (4) comprising a release layer, a printing layer and an adhesive layer on the film (3), simultaneously molding-transferring was continuously conducted according to the method described in (9). The film having no break during the molding and enabling a continuous process as well as causing no distorted patterns and no uneven printing on the molded article to which printing was transferred was evaluated as O, and the film otherwise was evaluated as X.

(11) Applicability as a Film for Molding Containers

After laminating a 16 μm thick polyester film and a 70 μm thick unstretched polypropylene film through an adhesive, the laminated film was preheated. Then, the laminated film was subjected to vacuum and airpressure forming using a mold having a cavity of an opening diameter of 10 cm and a depth of 3 cm to obtain a plastic tray. The case where ply separation between the polyester film and the polypropylene film or frequent break took place was evaluated as X, and the case where the process was conducted without any particular problems was evaluated as O.

EXAMPLE 1

A copolyester containing 100 ppm of amorphous silica particles of an average particle size of 1.0 μm and comprising 80 mol % of terephthalic acid unit, 15 mol% of isophthalic acid unit and 5 mol % of sebacic acid unit as the dicarboxylic acid component and ethylene glycol unit as the diol component was prepared. The copolyester was precrystallized and dried. The dried copolyester was then extruded at 285° C. from an extruder having a T-die, quenched and solidified to obtain an amorphous sheet having an intrinsic viscosity of 0.66. The sheet was stretched 3.3 times the original length in the machine direction at 85° C., 3.5 times the original length in the transverse direction at 100° C., then heat-treated at 185° C. with providing 10% relaxation in the transverse direction and 0.5% relaxation in the machine direction to obtain a biaxially stretched polyester film of an average thickness of 50 μm.

EXAMPLE 2

A 70/30 (wt %) mixture of a copolyester comprising 94 mol % of terephthalic acid unit and 6 mol % of adipic acid unit as the dicarboxylic acid component and 70 mol % of ethylene glycol unit and 30 mol % of 1,4-cyclohexane dimethanol as the diol component, and a polyethylene terephthalate containing 2000 ppm of kaolin of an average particle size of 1.1 μm was prepared. The film was subjected to the same drying, extrusion and film-forming process as in Example 1 to obtain a biaxially stretched polyester film of an average thickness of 38 μm and an intrinsic viscosity of 0.70.

COMPARATIVE EXAMPLE 1

The same drying and extrusion process as in Example 1 was repeated by using a copolyester containing 100 ppm of amorphous silica particles of an average particle size of 1.0 μm and comprising 97 mol % of terephthalic acid unit and 3 mol % of isophthalic acid unit as the dicarboxylic acid component and ethylene glycol unit as the diol component to obtain an amorphous sheet of an intrinsic viscosity of 0.62 The sheet was subjected to the same stretched process as in Example 1, then the stretched film was subjected to heat treatment at 200° C. under stress to obtain a biaxially stretched polyester film of an average thickness of about 50 μm.

The physical properties and the moldability and applicability as a transfer film of each of the films in Examples 1 and 2, and Comparative Example 1 are collectively shown in Table 1. The film obtained in Comparative Example 1 was unsuitable for transfer film because of its large $F_{100}$ value and poor moldability.

EXAMPLES 3 AND 4, COMPARATIVE EXAMPLE 2

Except for changing the stretch ratio in the machine direction to 3.5 times the original length, the same procedures as in Examples 1 and 2 and Comparative Example 1 were repeated to obtain each of the films of an average thickness of 16 μm.

The physical properties and applicabilities as a film for molding containers of the obtained films are collectively shown in Table 2. The film of Comparative Example 2 was unsuitable as a film for molding containers because of its large $F_{100}$ value and poor vacuum moldability.

direction at 75° C. between a heating roll and a cooling roll, and then stretched 3.6 times the original length in the transverse direction at 95° C. The thus stretched film was then subjected to heat treatment at 175° C. while relaxing the film 15% in the transverse direction and 0.5% in the machine direction to obtain a biaxially stretched polyester film having an average thickness of 38 μm and an intrinsic viscosity of 0.66.

EXAMPLE 6

A copolyester containing the same particles as in Example 5 and comprising 80 mol% of terphthalic acid unit and 17 mol % of isophthalic acid unit and 3 mol % of 1,10-decanedicarboxylic acid unit as the dicarboxylic acid component and 98 mol % of ethylene glycol and 2 mol % of diethylene glycol as the diol component was prepared. The copolyester was subjected to the same drying, extrusion and film-formation process as in Example 5 to obtain a biaxially stretched polyester film having an average thickness of 38 μm and an intrinsic viscosity of 0.66.

EXAMPLE 7

A copolyester (A) comprising 84 mol % of terephthalic acid unit and 16 mol % of adipic acid unit as the dicarboxylic acid component and ethylene glycol as the diol component, and a copolyester (B) comprising terephthalic acid unit as the dicarboxylic acid unit and 80 mol % of ethylene glycol unit and 20 mol % of neopentyl glycol unit as the diol component and containing 2000 ppm of calcium carbonate particles of an average particle size of 0.9 μm were blended in a weight ratio of 1:1 and dried. The dried blend was extruded at 70° C., quenched and solidified to obtain an amorphous sheet.

TABLE 1

| | Tensile strength at 100% elongation at 150° C. (kg/mm²) | | | | | | Heat shrinkage (%) | | Evaluation as transfer film | |
|---|---|---|---|---|---|---|---|---|---|---|
| | Machine direction | Transverse direction | $F_{100}$ | $\bar{n}$ | $\Delta P$ | $\Delta n$ | Machine direction | Transverse direction | Moldability | Applicability |
| Example 1 | 1.3 | 2.1 | 1.7 | 1.594 | 0.078 | 0.013 | 4.0 | −1.4 | ○ | ○ |
| Example 2 | 2.1 | 2.3 | 2.2 | 1.586 | 0.068 | 0.007 | 2.5 | −2.1 | ○ | ○ |
| Comparative Example 1 | 7.8 | 8.4 | 8.1 | 1.600 | 0.146 | 0.016 | 2.5 | 3.6 | X | X |

TABLE 2

| | Tensile strength at 100% elongation at 150° C. (kg/mm²) | | | | | | Heat shrinkage (%) | | Applicability of film for molding container |
|---|---|---|---|---|---|---|---|---|---|
| | Machine direction | Transverse direction | $F_{100}$ | $\bar{n}$ | $\Delta P$ | $\Delta n$ | Machine direction | Transverse direction | |
| Example 3 | 1.8 | 2.0 | 1.9 | 1.594 | 0.092 | 0.008 | 4.0 | −0.7 | ○ |
| Example 4 | 2.7 | 2.5 | 2.6 | 1.587 | 0.083 | 0.003 | 3.0 | −1.7 | ○ |
| Comparative Example 2 | 8.3 | 8.3 | 8.3 | 1.600 | 0.154 | 0.005 | 3.1 | 3.3 | X |

EXAMPLE 5

A copolyester containing 500 ppm amorphous silica fine particles having an average particle size of 1.4 μm and comprising 80 mol % of terephthalic acid unit, 16 mol % of isophthalic acid unit and 4 mol % of sebacic acid unit as the dicarboxylic acid component and 98 mol % of ethylene glycol unit and 2 mol % of diethylene glycol unit as the diol component was prepared. The dried copolyester was precrystallized and dried. The dried copolyester was then extruded at 280° C. from an extruder having a T-die, quenched and solidified to obtain an amorphous sheet. The amorphous sheet was stretched 3.0 times the original length in the machine The sheet was stretched 2.8 times the original length in the machine direction and 3.8 times the original length at 90° C. in the transverse direction. The thus stretched film was further heat-treated at 180° C., then subjected to 10% relaxation in the transverse direction at 170° C. to obtain a biaxially stretched polyester film having an average thickness of 25 μm and an intrinsic viscosity of 0.70.

EXAMPLE 8

A copolyester comprising 86 mol % of terephthalic acid and 14 mol % of suberic acid as the dicarboxylic acid component and ethylene glycol unit as the diol component, and the copolyester (B) referred in Example 7 were blended in a weight ratio of 1:1. The blend was subjected to the same drying and film-formation as in Example 7 to obtain a biaxially stretched polyester film having an average thickness of 25 μm and an intrinsic viscosity of 0.72.

The results of the evaluations on the films obtained in Examples 5-8 are collectively shown in Table 3.

heating roll and a cooling roll, and 3.6 times the original length at 95° C. in the transverse direction. The thus stretched film was then heat-treated at 175° C. while relaxing the film 15% in the transverse direction and 0.5% in the machine direction to obtain a biaxially stretched polyester film having an average thickness of 50 μm and an intrinsic viscosity of 0.65.

The physical properties and moldability are applicability as a mold-transfer film of each of the films ob-

TABLE 3

|  | Content of aliphatic dicarboxylic acid component (mol %) | Tensile strength at 100% elongation at 150° C. (kg/mm$^2$) | | | Thickness unevenness (%) | $\bar{n}$ | ΔP | Δn |
|---|---|---|---|---|---|---|---|---|
|  |  | Machine direction | Transverse direction | $F_{100}$ |  |  |  |  |
| Example 5 | 4.0 | 1.7 | 1.6 | 1.65 | 19 | 1.587 | 0.069 | 0.005 |
| Example 6 | 3.0 | 1.9 | 1.8 | 1.85 | 17 | 1.586 | 0.071 | 0.006 |
| Example 7 | 8.2 | 1.6 | 2.3 | 1.95 | 23 | 1.584 | 0.075 | 0.013 |
| Example 8 | 7.1 | 1.8 | 2.4 | 2.20 | 26 | 1.585 | 0.078 | 0.015 |

|  | Heat shrinkage (%) | | Evaluation as transfer film | | Applicability of film for molding container |
|---|---|---|---|---|---|
|  | Machine direction | Transverse direction | Moldability | Applicability |  |
| Example 5 | 3.8 | −0.6 | ○ | ○ | ○ |
| Example 6 | 3.7 | −0.7 | ○ | ○ | ○ |
| Example 7 | 2.7 | −0.3 | ○ | ○ | ○ |
| Example 8 | 2.8 | −0.2 | ○ | ○ | ○ |

EXAMPLES 9-11 tained in Examples 9-11 are collectively shown in Table 4.

TABLE 4

|  | Gloss Gs (60°) (%) | Tensile strength at 100% elongation at 150° C. (kg/mm$^2$) | | | Heat shrinkage (%) | | Ra (μm) | Evaluation as transfer film | |
|---|---|---|---|---|---|---|---|---|---|
|  |  | Machine direction | Transverse direction | $F_{100}$ | Machine direction | Transverse direction |  | Moldability | Applicability |
| Example 9 | 76 | 2.0 | 1.9 | 1.95 | 3.3 | −0.7 | 0.15 | ○ | ○ |
| Example 10 | 51 | 2.7 | 2.5 | 2.60 | 2.8 | −0.9 | 0.20 | ○ | ○ |
| Example 11 | 25 | 3.4 | 3.3 | 3.35 | 2.4 | −1.0 | 0.31 | ○ | ○ |

A copolyester (C) comprising 74 mol % of terephthalic acid unit, 20 mol % of isophthalic acid unit and 6 mol % of sebacic acid unit as the dicarboxylic acid component and ethylene glycol unit as the diol component, and a polyethylene terephthalate (D) containing 4.0 wt % of amorphous silica particles of an average particle size of 2.4 μm in respective weight ratio of (C):(D)=90:10 (Example 9), (C):(D)=80:20 (Example 10) and (C):(D)=70:30 (Example 11). Each of the blends was precrystallized and dried. Each of the dried blends was extruded at 280° C. from an extruder having a T-die, quenched and solidified to obtain an amorphous sheet. The sheet was then stretched 2.0 times the original length at 75° C. in the machine direction between a

What is claimed is:

1. A moldable biaxially stretched polyester film having a tensile strength at 100% elongation ($F_{100}$) of 0.5 to 7 kg/mm$^2$ at a temperature of 150° C. and comprising a polyester having a unit derived from an aliphatic dicarboxylic acid in a ratio of 1 to 20 mol % based on the total amount of dicarboxylic acid components.

2. A film according to claim 1, wherein the film has an unevenness in thickness of 40% or less.

3. A film according to claim 1, wherein the film has a gloss Gs (60°) in the range from 10 to 90%.

4. A film according to claim 1, wherein the film has a density in the range of 1.345 to 1.390 g/cm$^3$.

* * * * *